(No Model.)

J. SCHMIDLAPP.
VEHICLE SPRING.

No. 244,936. Patented July 26, 1881.

Witnesses
Otto Hufland
William Miller

Inventor.
Jacob Schmidlapp.
by Van Santvoord & Hauff
his att'ys.

UNITED STATES PATENT OFFICE.

JACOB SCHMIDLAPP, OF NEW YORK, N. Y.

VEHICLE-SPRING.

SPECIFICATION forming part of Letters Patent No. 244,936, dated July 26, 1881.

Application filed June 21, 1881. (No model.)

*To all whom it may concern:*

Be it known that I, JACOB SCHMIDLAPP, a citizen of the United States, residing at New York, in the county and State of New York, have invented new and useful Improvements in Vehicle-Springs, of which the following is a specification.

This invention consists in the combination of two elliptical springs, each of which is composed of two or more leaves, C-springs formed by extensions of the main leaf of one of the springs, eyes formed on the second leaf of the upper and on the first or second leaf of the lower spring, and straps for connecting the eyes; also, in the combination of two elliptical springs each of which is composed of two or more leaves, C-springs formed by extensions of the main leaf of the upper spring, eyes formed on the ends of the second leaf of the upper spring, metallic bolsters secured to the upper spring, eyes formed on the ends of the main leaf of the lower spring and fitting into recesses formed in the bolsters, and straps for connecting the eyes of the upper spring with those of the lower spring.

This invention is illustrated in the accompanying drawings, in which—

Figure 1:
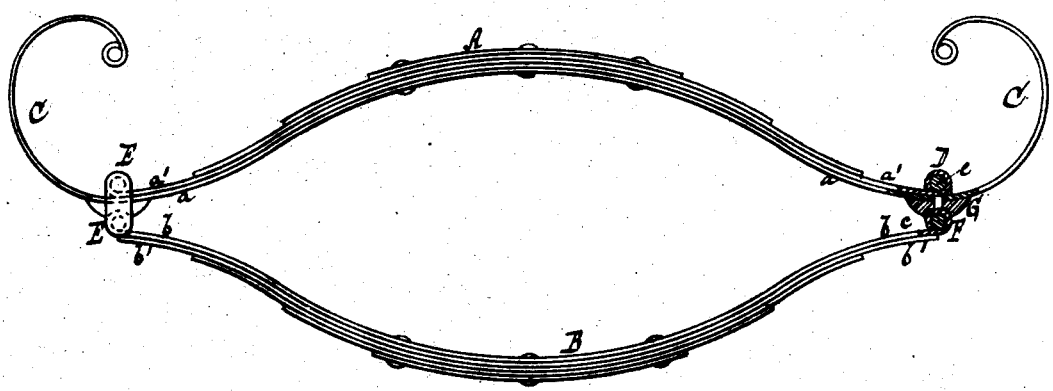
Figure 2:
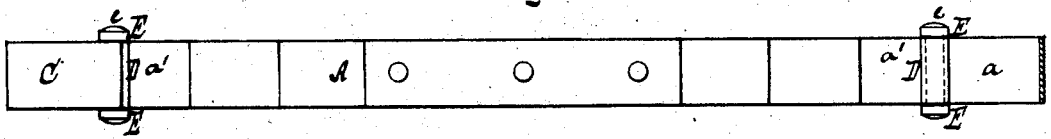

Figure 1 represents a side elevation, partly in section. Fig. 2 is a plan or top view.

Similar letters indicate corresponding parts.

In the drawings, the letter A designates the upper and B the lower elliptical spring, which are connected together and constitute my new spring for vehicles. Each of these springs A and B is composed of two or more leaves, and the main leaf *a* of the upper spring, A, is made with extensions, which are bent to form C-springs C. On the ends of the second leaf *a'* of the upper spring are formed eyes D, which connect by straps E and pivots *e* with eyes F, formed on the ends of either the main leaf *b*, or the second leaf *b'* of the lower spring, B. In the example shown in the drawings the eyes F are formed on the ends of the main leaf *b* of the lower spring, and these eyes rest in concave recesses *c* formed in metallic bolsters G, which are firmly secured to the main leaves *a* of the upper spring. These bolsters, however, are not absolutely essential, and if they are left off the ends of the main leaf *b* of the lower spring, B, are riveted to the main leaf *a* of the upper spring, A, and then the eyes F are formed on the second leaf *b'* of the lower spring and connected to the eyes D by the straps E; or, if desired, the C-springs can be formed by extensions of the lower spring. By these means a spring is obtained which supports the body of a carriage or wagon, not only in the middle but also at its ends, and thereby the body is evenly supported and a firm and durable connection between the spring and the body is obtained.

It is obvious that my spring can be reversed, and in this case the term "lower spring" applied to the spring A, and the term "upper spring" to the spring B.

What I claim as new, and desire to secure by Letters Patent, is—

1. The combination, substantially as hereinbefore described, of two elliptical springs, each of which is composed of two or more leaves, C-springs formed by extensions of the main leaf of one of the springs, eyes formed on the second leaf of the upper and on one of the leaves of the lower spring, and straps for connecting the eyes.

2. The combination, substantially as hereinbefore described, of two elliptical springs, each of which is composed of two or more leaves, C-springs formed by extensions of the main leaf of the upper spring, eyes formed on the ends of the second leaf of the upper spring, metallic bolsters secured to the upper spring, eyes formed on the ends of the main leaf of the lower spring and fitting into recesses formed in the bolsters, and straps for connecting the eyes of the upper spring with those of the lower spring.

In testimony whereof I have hereunto set my hand and seal in the presence of two subscribing witnesses.

JACOB SCHMIDLAPP. [L. S.]

Witnesses:
W. HAUFF,
E. F. KASTENHUBER.